United States Patent
Emmert et al.

(10) Patent No.: US 9,968,021 B2
(45) Date of Patent: May 15, 2018

(54) WORK VEHICLE MULTI-COUPLER WITH BREAKAWAY FEATURE

(71) Applicant: Deere & Company, Moline, IL (US)

(72) Inventors: Robert C. Emmert, Waverly, IA (US); Michael A. Holland, Conrad, IA (US); Fernando Sandoval, Waterloo, IA (US); Nathanael Rehn, Waterloo, IA (US)

(73) Assignee: Deere & Company, Moline, IL (US)

( * ) Notice: Subject to any disclaimer, the term of this patent is extended or adjusted under 35 U.S.C. 154(b) by 159 days.

(21) Appl. No.: 15/000,599

(22) Filed: Jan. 19, 2016

(65) Prior Publication Data

US 2017/0202128 A1 Jul. 20, 2017

(51) Int. Cl.
*F16K 17/40* (2006.01)
*A01B 59/042* (2006.01)
(Continued)

(52) U.S. Cl.
CPC .......... *A01B 59/042* (2013.01); *A01B 59/043* (2013.01); *A01B 61/025* (2013.01);
(Continued)

(58) Field of Classification Search
CPC ........... F16L 36/00; B60D 1/64; B60D 1/243; B60D 1/36; B60D 1/363; B60K 17/28;
(Continued)

(56) References Cited

U.S. PATENT DOCUMENTS 4,738,463 A * 4/1988 Poore ................... A01B 59/062
  280/420
5,758,682 A * 6/1998 Cain ....................... F16K 17/40
  137/543.13

(Continued)

FOREIGN PATENT DOCUMENTS

DE  102009056071 A1   6/2011
EP      2399441 A1 * 12/2011  .............. F16L 37/18

OTHER PUBLICATIONS

German Search Report for Application No. 102017200743.5 dated Jun. 13, 2017.
Utility U.S. Appl. No. 14/520,692, filed Oct. 22, 2014.

*Primary Examiner* — Minh Le
(74) *Attorney, Agent, or Firm* — Lorenz & Kopf, LLP (57) ABSTRACT

A multi-coupler assembly for a work vehicle includes a first bank of fluid connectors, a second bank of fluid connectors configured to matingly engage the first bank of fluid connectors along a coupling axis, and a coupler mechanism coupled to the first bank of fluid connectors. The coupler mechanism is controllable to bring the second fluid connector bank into mating engagement with the first fluid connector bank. A breakaway feature is integrated into the coupler mechanism. The breakaway feature facilitates controlled disengagement of the first fluid connector bank from the second fluid connector bank along the coupling axis during a breakaway event, such as when an implement inadvertently detaches from the work vehicle. The breakaway feature may permit controlled disengagement of the first and second fluid connector banks without requiring movement of the coupler mechanism.

18 Claims, 7 Drawing Sheets

(51) Int. Cl.
- *B60D 1/24* (2006.01)
- *B60D 1/64* (2006.01)
- *F16L 35/00* (2006.01)
- *B60D 1/28* (2006.01)
- *F16L 37/56* (2006.01)
- *A01B 59/043* (2006.01)
- *A01B 61/02* (2006.01)
- *F16L 55/10* (2006.01)
- *B60D 1/00* (2006.01)

(52) U.S. Cl.
CPC ............... *B60D 1/243* (2013.01); *B60D 1/28* (2013.01); *B60D 1/64* (2013.01); *F16L 35/00* (2013.01); *F16L 37/56* (2013.01); *B60D 2001/008* (2013.01); *F16L 55/1015* (2013.01)

(58) Field of Classification Search
CPC .... A01B 59/042; A01B 59/043; A01B 59/069
USPC .............. 137/68.11, 68.14; 280/479.3, 421; 172/456; 403/44, 59, 93, 111, 322.4, 403/374.5, 374.1
See application file for complete search history.

(56) References Cited

U.S. PATENT DOCUMENTS

| | | | | |
|---|---|---|---|---|
| 5,997,320 | A * | 12/1999 | DeMello | B60D 1/64 439/148 |
| 6,588,513 | B1 * | 7/2003 | Gustafson | A01B 59/043 172/439 |
| 6,631,916 | B1 * | 10/2003 | Miller | A01B 59/042 172/279 |
| 7,290,977 | B2 * | 11/2007 | Albright | E02F 3/3627 37/468 |
| 7,464,967 | B2 * | 12/2008 | Mieger | B60D 1/62 285/124.1 |
| 7,575,462 | B2 * | 8/2009 | Macey | B60D 1/64 439/352 |
| 7,670,157 | B2 * | 3/2010 | Miyamoto | H01R 13/62938 403/322.4 |
| 7,959,451 | B2 * | 6/2011 | Tonosaki | H01R 13/62938 439/157 |
| 8,336,922 | B2 * | 12/2012 | Tiberghien | F16L 37/56 137/594 |
| 8,740,257 | B2 * | 6/2014 | Groβ | F16L 39/04 285/123.12 |
| 2011/0226527 | A1 * | 9/2011 | Ritchie-Bland | F16L 1/123 174/669 |

* cited by examiner

WORK VEHICLE MULTI-COUPLER WITH BREAKAWAY FEATURE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates generally to work vehicles and, more particularly, to coupler assemblies that join fluid lines extending from a work vehicle to an implement attachment.

BACKGROUND OF THE DISCLOSURE

Work vehicles, such as those used in the agriculture, construction, forestry and mining industries, may have implements attached at the front and/or rear of the work vehicle. Example implements common in such industries include excavator and loader buckets, tillage machines, mowers, balers, planting machines, tree felling heads and so on. To perform operational movements (e.g., lifting, tool adjustment, baling, seeding, cutting, general orientation changes, etc.), the implements may have actuators (e.g., electric, hydraulic, pneumatic, etc.) that are powered by generators, pumps and motors that are driven by the engine of a host or towing vehicle (e.g., tractor, loader, etc.). Flexible power lines may be used to connect the actuators of the implement to the work vehicle to which it is attached to allow for relative movement of the work vehicle and the implement when turning or traveling over uneven terrain. Depending on the application, numerous power lines may need to be connected and disconnected when attaching and detaching the implement. Inadvertent separation of the implement from the work vehicle may stress and damage the power lines and components of the work vehicle and implement to which they are coupled.

SUMMARY OF THE DISCLOSURE

Work vehicle multi-coupler assemblies having controlled breakaway features are provided. In one embodiment, the work vehicle multi-coupler assembly includes a first bank of fluid connectors, a second bank of fluid connectors configured to matingly engage the first bank of fluid connectors along a coupling axis, and a coupler mechanism coupled to the first bank of fluid connectors. The coupler mechanism is controllable to bring the second bank of fluid connectors into mating engagement with the first bank of fluid connectors. A breakaway feature is integrated into the coupler mechanism and facilitates controlled disengagement of the first bank of fluid connectors from the second bank of fluid connectors along the coupling axis during a breakaway event, such as when a work implement inadvertently detaches from a tractor or other work vehicle. The breakaway feature permits controlled disengagement of the first and second banks of fluid connectors.

In another embodiment, the work vehicle multi-coupler assembly is utilized in conjunction with work implement including an implement-side fluid connector bank retained in an implement-side connector block. In such an embodiment, the work vehicle multi-coupler assembly may include a vehicle-side fluid connector bank, a vehicle-side connector into which the vehicle-side fluid connector bank is inserted, and a coupler mechanism movably coupled to the vehicle-side connector block and configured to latch to the implement-side connector block. The coupler mechanism may be configured to bring the implement-side fluid connector bank into mating engagement with the vehicle-side fluid connector bank when latched to the implement-side connector block and moved from a receiving position toward a coupling position. The coupler mechanism may further include a breakaway feature, which permits controlled breakaway of the vehicle-side fluid connector bank and the implement-side connector bank while the coupler mechanism remains in the coupling position.

Embodiments of a work vehicle, such as a tractor, including a multi-coupler assembly are further provided. In one embodiment, the work vehicle is configured to be removably connected to an implement including an implement-side fluid connector bank, which is retained in an implement-side connector block. The implement-side connector block may include a guide, such as a laterally-projecting roller pin. In such an embodiment, the work vehicle may include a vehicle body and a multi-coupler assembly attached to the vehicle body. The multi-coupler assembly may include, in turn: (i) a vehicle-side fluid connector bank retained in a vehicle-side connector block and configured to matingly engage the implement-side fluid connector bank, (ii) a coupler mechanism rotatably coupled to the vehicle-side connector block and movable between a receiving position and a coupling position, and (iii) a breakaway feature including or assuming the form of an exit slot formed in the coupler mechanism. The coupler mechanism may have a guideway in which the guide may be received such that the coupler mechanism may be rotated to bring the implement-side fluid connector bank into mating engagement with the vehicle-side fluid connector bank. Additionally, the exit slot may intersect the guideway such that, when the coupler mechanism is in the coupling position, the guide is permitted to pass through the exit slot and thereby facilitate disengagement of the first and second banks of fluid connectors during breakaway of the implement from the vehicle body.

The details of one or more embodiments are set forth in the accompanying drawings and the description below. Other features and advantages will become apparent from the description, the drawings, and the claims.

BRIEF DESCRIPTION OF THE DRAWINGS

At least one example of the present invention will hereinafter be described in conjunction with the following figures, wherein like numerals denote like elements, and.

DETAILED DESCRIPTION

The following describes one or more example embodiments of the disclosed multi-coupler assembly, as shown in the accompanying figures of the drawings described briefly above. Various modifications to the example embodiment(s) may be contemplated by one of skill in the art.

Specialized devices referred to as "multi-couplers" or "multi-coupler assemblies" enable multiple mating pairs of fluid lines to be quickly connected (or disconnected) when attaching a work implement to (or detaching the work implement from) a work vehicle. In so doing, a multi-coupler assembly may significantly reduce the amount of time required to attach and detach the work implement from the work vehicle, while helping to ensure that the fluid lines are coupled in a proper manner (e.g., such that fluid connectors of opposing polarities are appropriately joined). By conventional design, the multi-coupler assembly typically locks the mating pairs of fluid connectors in mating engagement. Disengagement of the fluid line pairs is thus prevented by the multi-coupler assembly until the operator later controls the multi-coupler assembly (e.g., by rotating a cam-lever device) to disconnect the fluid line pairs when later detaching the work implement from the vehicle. In implementations in which the likelihood of unintended detachment or "breakaway" of a work implement is essentially non-existent, this may be acceptable. However, this failing of conventional multi-coupler assemblies may be problematic in instances wherein work implement breakaway can occur. During such a breakaway event, significant damage may occur to the multi-coupler assembly, to the work implement, and/or to work vehicle itself if adequate countermeasures are not provided. Hoses or other fluid lines may be subject to considerable pulling forces during a breakaway event and may consequently be especially vulnerable to physical damage, such as tearing or rupture.

There thus exists an ongoing need for work vehicle multi-coupler assemblies that not only facilitate the connection and disconnection of multiple mating pairs of fluid connectors, but which also decrease the likelihood of damage in the event of implement breakaway. The following describes embodiments of a work vehicle multi-coupler assembly having controlled breakaway functionality. Under normal operating conditions, the multi-coupler assembly permits mating banks of fluid connectors to be quickly and accurately connected or disconnected, as desired. However, in the event of implement breakaway, the multi-coupler mechanism permits the controlled detachment of mating banks of fluid connectors in a manner reducing or substantially eliminating the likelihood of damage to the coupler mechanism, to the fluid lines, and to the surrounding work vehicle components. In certain embodiments, the multi-coupler assembly may include first and second connector blocks, which secure first and second banks of fluid connectors in corresponding arrays. The multi-coupler assembly may also include a coupler mechanism, such as a manually-actuated cam-lever device. When moved toward a coupling position, the coupler mechanism may bring the connector blocks into a relative position in which the first bank of fluid connectors matingly engages the second bank of fluid connectors along a coupling axis. The breakaway feature may then facilitate or enable controlled breakaway of the fluid connector banks along the coupling axis during a breakaway event, usefully without requiring movement of the coupler mechanism. In one embodiment, and by way of non-limiting example only, the breakaway feature may be an exit slot formed in the coupler mechanism, which is shaped and dimensioned to permit passage of a guide (e.g., roller pin) mounted to the second connector block while the coupler mechanism remains in the coupling position. If desired, a tether may further be connected to the implement-side connector block and provided with a slack length less than the respective slack lengths of one or more fluid lines (e.g., the shortest fluid line) carried by the work implement. In this manner, a pull force urging separation of the connector blocks will be primarily or exclusively applied through the tether rather than through the fluid lines should the work implement unintentionally detach or breakaway from the work vehicle. The likelihood of structural damage during a breakaway event may be further reduced as a result.

The multi-coupler assembly described herein may be utilized in conjunction with any type of work vehicle having an interface at which multiple banks of fluid connectors are joined and which may be damaged during a breakaway event absent the below-described breakaway functionality. Embodiments of the multi-coupler assembly may be particularly well-suited for usage in conjunction with work vehicles permitting the selective attachment of work implements, which carry fluid lines and/or fluid-driven devices. Tractors, for example, may be equipped with certain work implements, such as mowers, balers, tillage machines, seeders and other agricultural implements, which are towed behind the tractor and may be subject to breakaway. A breakaway event may occur, for example, should the work implement accidently catch on a stationary object, should the work implement not be securely connected to the work vehicle, or should a coupling component fail (e.g., drawbar, connecting pin, etc.). Embodiments of the multi-coupler assembly are thus described below primarily in conjunction with a tractor to provide a representative, albeit non-limiting context in which the multi-coupler assembly may be better understood.

Figure 1:
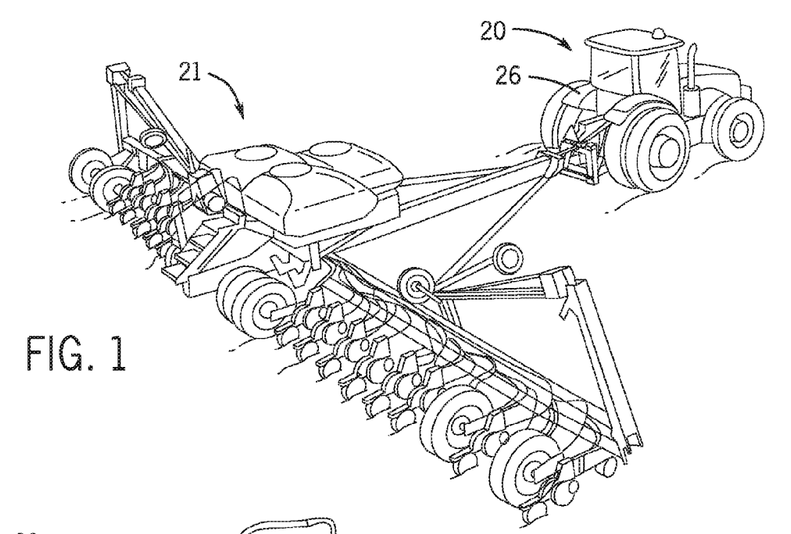
FIG. 1 is a simplified isometric view of an example work vehicle and implement attachment, in the form of a tractor and planter attachment, with which embodiments of the multi-coupler assembly may be utilized, as illustrated in accordance with an example embodiment.
Figure 2:
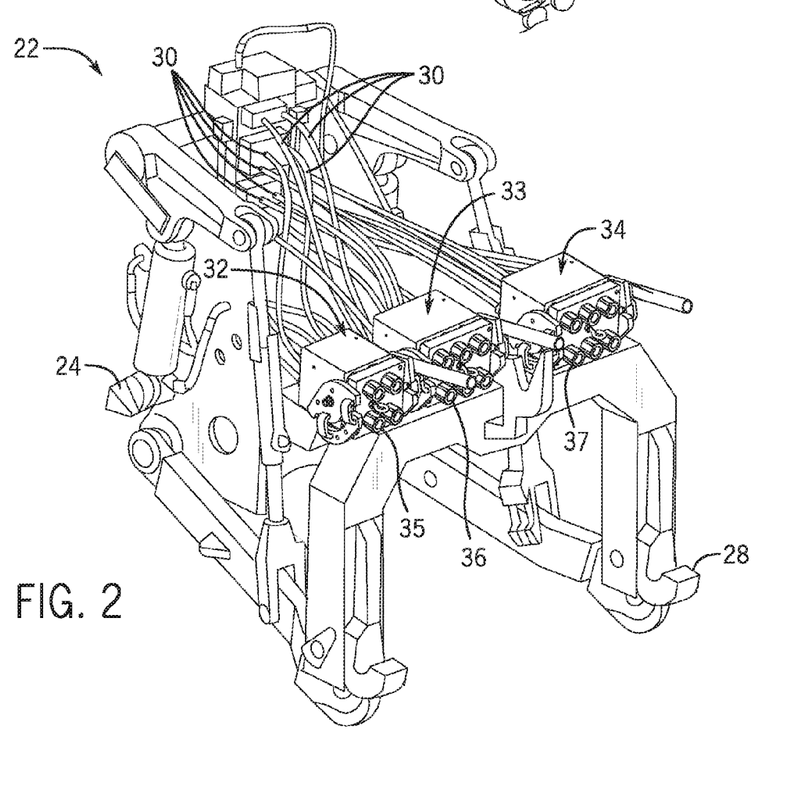
FIG. 2 is an isometric view of a three-point hitch assembly suitable for attachment to the tractor shown in FIG. 1 and equipped with a row of multi-coupler assemblies, as illustrated in accordance with an example embodiment.

FIG. 1 is a side view of a tractor 20 having a body or chassis to which a work implement 21 may be attached. Work implements of various types may be selectively attached and removed from tractor 20 utilizing, for example, a three-point (3-point) hitch 22 of the type shown in FIG. 2. More specifically, and referring jointly to FIGS. 1 and 2, a leading end 24 of the 3-point hitch 22 may be mounted to a rear portion 26 of the tractor 20. Opposite the leading end 24, a trailing end 28 of the 3-point hitch 22 may be attached to a modular work vehicle implement. The 3-point hitch 22 is equipped with a number of fluid lines 30 (only a few of which are labeled in FIG. 2), which may a supply working fluid and/or carrier fluid to fluid-driven devices carried by the work implement. The fluid lines 30 may include, for example, hydraulic lines through which hydraulic fluid is exchanged with hydraulic cylinders carried by the work implement, such as hydraulic cylinders utilized to transition a winged work agricultural implement between a relatively wide deployed (unfolded) position and a relatively narrow transport (folded) position. In further embodiments, the fluid lines 30 can conduct another type of fluid (gas or liquid), such as pressurized airstreams supplied to one or more pneumatic devices.

Three example multi-coupler assemblies 32-34 are mounted to the trailing end 28 of the 3-point hitch 22. The multi-coupler assemblies 32-34 enable a work vehicle operator, such as an operator of the tractor 20, to efficiently and accurately couple the fluid lines 30 supported by the 3-point hitch 22 to corresponding fluid lines carried by a modular work implement, such as work implement 21 shown in FIG. 1. Accordingly, the multi-coupler assemblies 32-34 each include at least two groups or banks of mating fluid connectors. The mating pairs of fluid connectors may be coupled (and decoupled) utilizing the assemblies 32-34 to connect (and disconnect) the fluid lines 30 to the corresponding plurality of fluid lines carried by work implement 21. The fluid connectors joined to the fluid lines 30 are hidden from view in FIG. 2, but are shown and described below in conjunction with FIGS. 3-13. Similarly, the fluid lines carried by work implement 21 are not shown in FIG. 1 for illustrative clarity; however, the fluid connectors joined to the non-illustrated fluid lines are shown and identified by reference numerals "35," "36," and "37," which identify the banks of fluid connectors included in the assemblies 32, 33, and 34, respectively. In the illustrated example, multi-coupler assembly 32 includes four pairs of mating connectors, while the multi-coupler assemblies 33 and 34 each contain six pairs of mating connectors. In further embodiments, each multi-coupler assembly may contain a greater or lesser number of connector pairs, and the 3-point hitch 22 (or another part of the larger work vehicle) may be equipped with any suitable number of multi-coupler assemblies.

Figure 3:
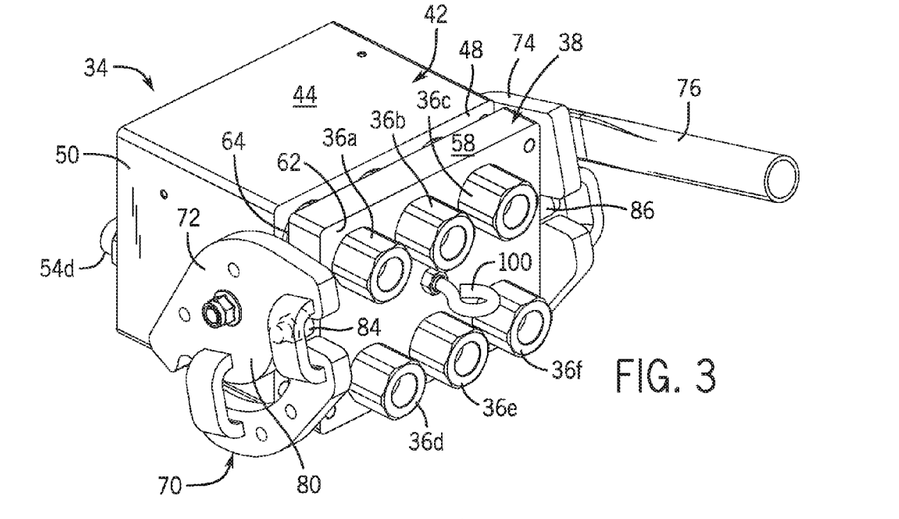
FIGS. 3-5 are front, rear, and exploded isometric views, respectively, of one of the multi-coupler assemblies shown in FIG. 2.
Figure 4:
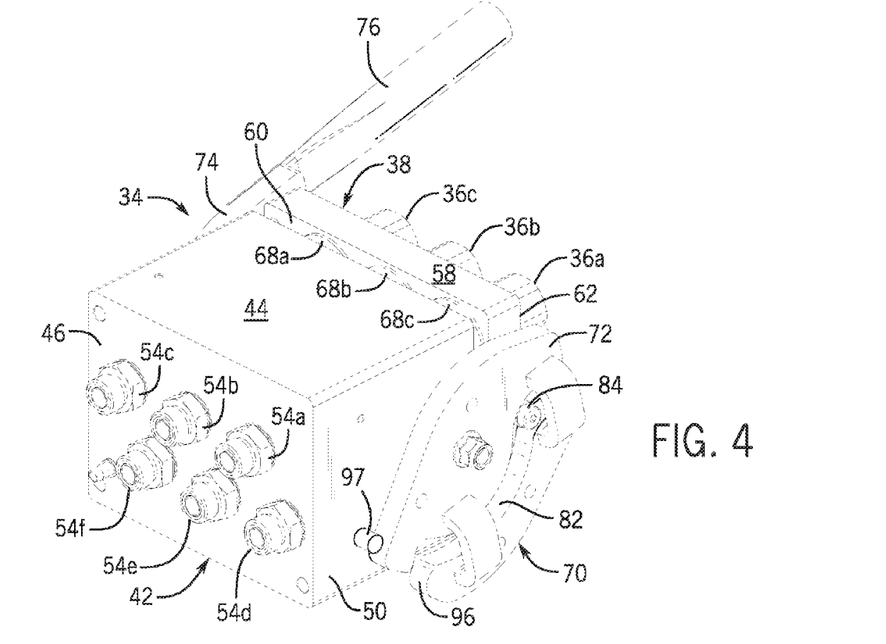
Figure 5:
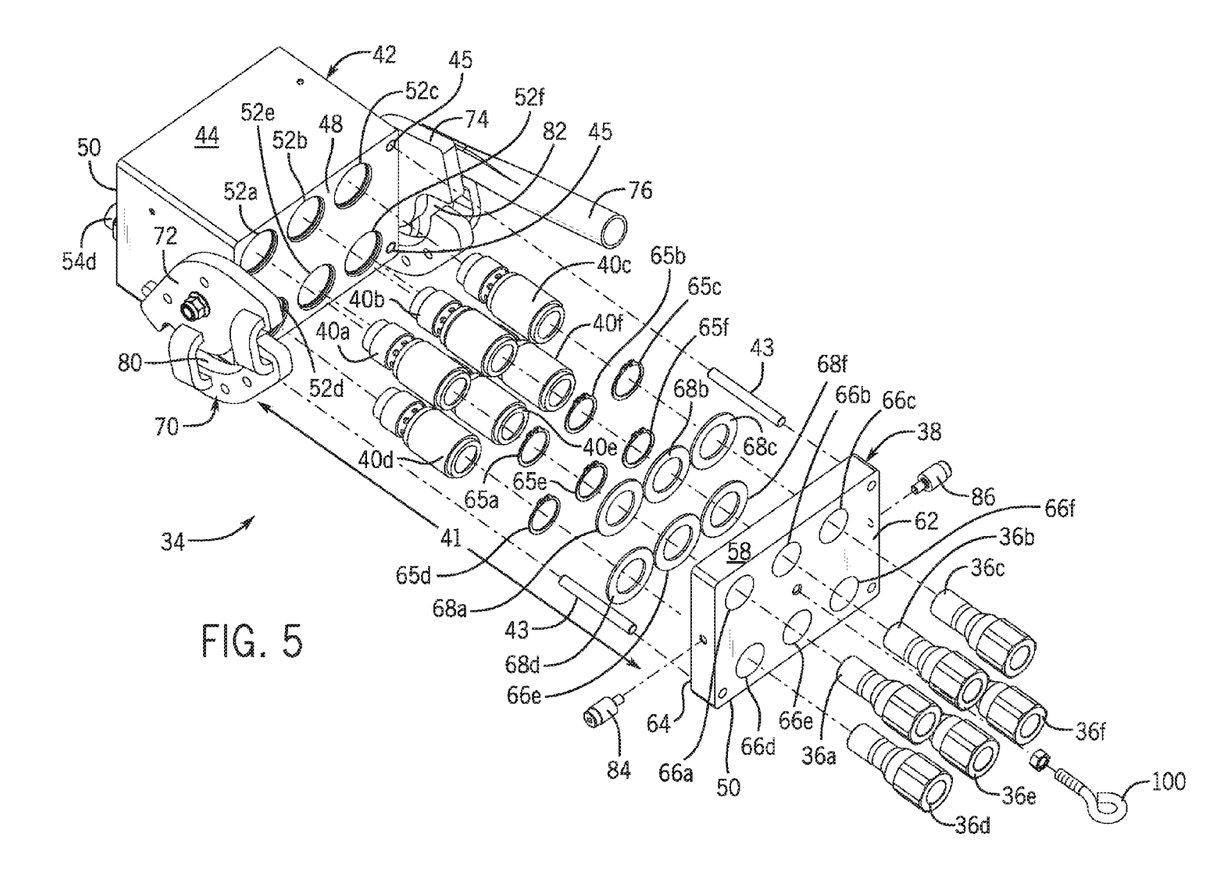
Figure 6:
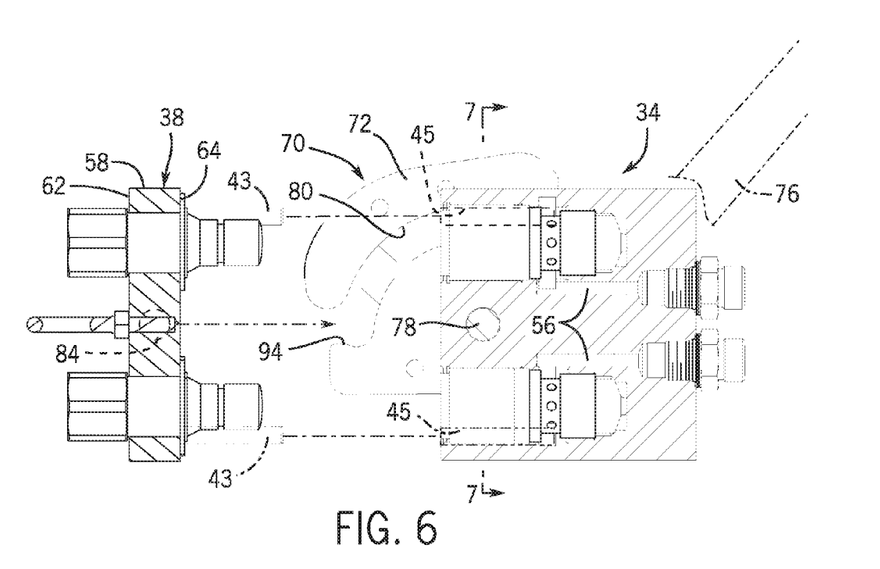
FIG. 6 is a side sectional view thereof.
Figure 7:
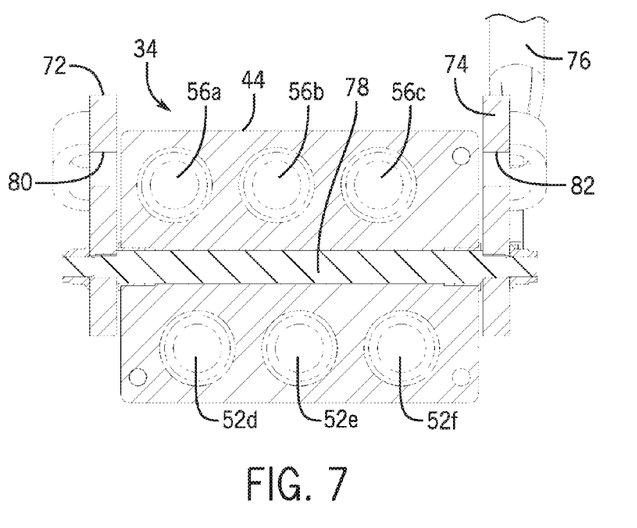
FIG. 7 is a front sectional view thereof, as taken along section plane 7-7 of FIG. 6.

The example multi-coupler assembly 34 will now be described in detail in conjunction with FIGS. 3-14. While focusing on the multi-coupler assembly 34, the following description is equally applicable to the other coupler assemblies shown in FIG. 2, which may be substantially identical to the multi-coupler assembly 34 in the case of the assembly 33 or similar to the multi-coupler assembly 34 in the case of the assembly 32. Referring initially to FIGS. 3-5, and as previously noted, the multi-coupler assembly 34 includes a first or "implement-side" bank of fluid connectors 36. The implement-side fluid connector bank 36 consists of six connectors 36a-f, which are registered or maintained in a desired spatial arrangement by a first connector block 38 (hereafter the "implement-side connector block 38"). As may also be seen in FIGS. 4 and 5, the multi-coupler assembly 34 further includes a second or "vehicle-side" bank of fluid connectors 40 containing six connectors 40a-f. The vehicle-side fluid connector bank 40 extends into and is maintained in a corresponding spatial arrangement by a second connector block 42 (hereafter the "vehicle-side connector block 42"). The connector blocks 38, 42 may simultaneously couple corresponding pairs of the connectors 36a-f, 40a-f when brought into an axially-adjacent or end-to-end position along a coupling axis (represented in FIG. 5 by double-headed arrow 41). Locating pins 43 (shown most clearly in FIG. 5) may be utilized to ensure proper alignment of the connector banks 36, 40 when the connector blocks 38, 42 are brought into the end-to-end position (FIGS. 3 and 4). When brought into the end-to-end position, the connector blocks 38, 42 may contact one another or may instead be separated by an axial gap.

As appearing herein, the term "connector block" refers to any structure or assembly that supports a group of fluid connectors in a desired spatial arrangement. Thus, the word "block" appearing in the term "connector block" does not require that the connector block necessarily has a block-like shape. In the illustrated example, the implement-side connector block 38 has a block-like shape or a generally cuboidal geometry, while the vehicle-side connector block 42 has a plate-like shape. The implement-side connector block 38 may be, for example, a machined metal sheet or plate, while the vehicle-side connector block 42 is a cast and machined metal block in an embodiment. Various other constructions are possible in alternative embodiments. The connector blocks 38, 42 are advantageously designed to at least partially house the fluid connectors 36a-f, 40a-f, respectively, in a secure and physically-protective manner, while also permitting in-field removal of the connectors 36a-f, 40a-f when needed. However, in certain embodiments, the fluid connectors 36a-f, 40a-f may be secured within connector blocks 38,42 in a non-removable manner or integrated into connector blocks 38, 42. The manner in which the implement-side connector block 38 supports the fluid connectors 36a-f (collectively, the "implement-side fluid connector bank 36") in a desired spatial array and the manner in which the vehicle-side connector block 42 supports the fluid connectors 40a-f (collectively, the "vehicle-side fluid connector bank 42") in a corresponding spatial array will now be described.

With continued reference to FIGS. 3-5, the vehicle-side connector block 42 includes a body 44 having a forward face 46, an aft face 48 opposite the forward face 46, and opposing sidewalls 50. Axially-extending bores or openings 52a-f (identified in FIG. 5) extend into the vehicle-side connector block 42 from the aft face 48 thereof, but do not extend to the forward face 46 to fully penetrate the connector block 42. The openings 52a-f are shaped and dimensioned to matingly receive the fluid connectors 40a-f therein. The body 44 of the vehicle-side connector block 42 may be sufficiently large to house connectors 40a-f in or near their entirety when received within the connector block 42. The fluid connectors 40a-f may be secured within the connector block 42 by snap rings, a threaded interface, or various other features or structures. As shown in FIG. 4, a number of fittings 54a-f are further installed in the vehicle-side connector block 42 and project from the forward face 46 thereof. When the multi-coupler assembly 34 is fully assembled, the fittings 54a-f are fluidly coupled to the fluid connectors 40a-f, respectively, by internal flow passages 56 provided within the vehicle-side connector block 42. Two such internal flow passages 56 may be seen in the cross-sectional view of the connector block 42 shown in FIG. 6.

As does the vehicle-side connector block 42, the implement-side connector block 38 includes a body 58 having a forward face 60, an aft face 62 opposite the forward face 60, and opposing sidewalls 64. Axially-extending bores or openings 66a-f are provided in and extend through the body 58 of the implement-side connector block 38. The fluid connectors 36a-f are received through the openings 66a-f when the multi-coupler assembly 20 is assembled. Disengagement of the fluid connectors 36a-f from the implement-side connector block 38 in a forward direction may be prevented by abutment of the larger outer diameter portions of the connectors 36a-f with the aft face 62 of the connector block 38. Unintended disengagement of the fluid connectors 36a-f from the implement-side connector block 38 in an aft direction is further prevented by snap rings 65a-f, which may be installed around the fluid connectors 36a-f, respectively, after insertion through the openings 66a-f. In other embodiments, the fluid connectors 36a-f may be secured within the implement-side connector block 38 utilizing different structural features or elements, such as a threaded interface. If desired, gaskets 68a-f may also be installed between the snap rings 65a-f and the forward face 60 for sealing purposes.

In the illustrated example, the fluid connectors 36a-f are male cartridge connectors or "tips," while the fluid connectors 40a-f are female cartridge connectors or "receivers." In further embodiments, the fluid connectors 36a-f may be female cartridge connectors or a mixture of male and female cartridge connectors. Correspondingly, in such embodiments, the fluid connectors 40a-f may be male cartridge connectors or a mixture of male and female cartridge connectors. Flat faced fluid connectors may be utilized in certain embodiments as such connectors tend to reduce spillage when connected and disconnected. Additionally, it may be particularly desirable to utilize self-latching fluid connectors with the work vehicle multi-coupler assembly 34 for reasons explained more fully below. Such self-latching fluid connectors may be designed such that an individual latching force is generated by each mating pair of fluid connectors when brought into mating engagement along the coupling axis 41 (FIG. 5). The foregoing notwithstanding, it is emphasized that various other types of mating fluid connectors may be utilized in further embodiments of the multi-coupler assembly 34.

A coupler mechanism 70 is further included in the work vehicle multi-coupler assembly 34. The coupler mechanism 70 is a manually-actuated device in the illustrated example. However, the multi-coupler assembly 34 may include a hydraulic-, pneumatically-, or electrically-driven coupler mechanism in further embodiments is not precluded. In the example shown in FIGS. 3-5, the coupler mechanism 70 includes the following major components or elements: (i) a first rotatable member 72 mounted to a first side of the vehicle-side connector block 42, (ii) a second rotatable member 74 mounted to a second, opposing side of the vehicle-side connector block 42, and (iii) a lever 76 fixedly attached to and projecting radially from the rotatable member 74. Additionally, as shown most clearly in the cross-sectional view of FIG. 7, the coupler mechanism 70 further includes a shaft 78 extending through the body 44 of the vehicle-side connector block 42 to connect the first rotatable member 72 and the second rotatable member 74 in a rotationally-fixed relationship. The first rotatable member 72, the second rotatable member 74, the lever 76, and the shaft 78 will thus rotate in unison when lever 76 is rotated by an operator to move the coupler mechanism 70 between the receiving and coupling positions described below.

In the illustrated example, a guideway or passageway is formed in each of the first and second rotatable members 72, 74. Specifically, a first cam slot 80 is formed in the first rotatable member 72, while a second cam slot 82 is formed in the second rotatable member 74. The first cam slot 80 is shaped and sized to receive a first guide member therein, such as a first roller pin 84. Similarly, the second cam slot 82 is shaped and sized to receive a second guide member therein, such as a second roller pin 86. As may be seen in FIGS. 3-5, the roller pins 84, 86 may be mounted to and project laterally from the opposing sidewalls 64 of the implement-side connector block 38. As indicated by the term "roller pin," the roller pins 84 and 86 may be rotatable with respect to the body 58 of the implement-side connector block 38 to decrease frictional forces; however, this is not necessary in all embodiments. Collectively, the cam slots 80, 82 and the roller pins 84, 86 cooperate to form twin guide-guideway engagement interfaces. In further embodiments, other types of engagement interfaces may be utilized providing that the coupler mechanism 70 may be manually manipulated by an operator (or otherwise controlled) to draw the connector blocks 38, 42 into a neighboring position and thereby bring corresponding pairs of the fluid connectors 36a-f, 40a-f into mating engagement. Furthermore, in an alternative implementation, the engagement interface 80, 82, 84, 86 may be inverted such that the cam slots 80, 82 are formed in the implement-side connector block 38 (the body 58 of which may be axially enlarged to accommodate the slot geometry), while the roller pins 84, 86 (or other laterally-projecting guide members) are mounted to rotatable members 72 and 74.

As indicated above, the coupler mechanism 70 is rotatable coupled to the vehicle-side connector block 42 such that the coupler mechanism 70 may be manually rotated between a first positional extreme (referred to as the "receiving position" and shown in FIGS. 3-5) and a second, opposing positional extreme (referred to as the "coupling position"). When rotated in this manner, the coupler mechanism 70 may cooperate with the roller pins 84, 86 to convey the implement-side connector block 38 into a position adjacent the vehicle-side connector block 42 and thereby bring the implement-side fluid connector bank 40 into mating engagement with the vehicle-side fluid connector bank 40 along the coupling axis 41 (FIG. 5). This movement is illustrated, in a step-by-step fashion, in FIGS. 8-13. The remainder of the description will thus now refer to these drawing figures in combination with FIGS. 3-7.

In the receiving position, the rotatable members 72, 74 are oriented such that the cam slots 82, 84 open towards the roller pins 84, 86, respectively, as taken along the coupling axis 41 (FIG. 5). Thus, when the coupler mechanism 70 is the receiving position (FIGS. 3-5), an operator may grasp and manually position the implement-side connector block 38 adjacent the vehicle-side connector block 42. Arrows 88 in FIGS. 8 and 11 indicate this motion. When positioned in this manner, the roller pins 84, 86 are introduced into an entry portion of the cam slots 82, 84, respectively. In this manner, the coupler mechanism 70 may effectively engage or latch to the implement-side connector block 38. Substantially concurrently, the fluid connectors 36a-f may be brought into initial engagement with the fluid connectors 40a-f. For example, in the illustrated example wherein the fluid connectors 36a-f are male-type connectors, the fluid connectors 36a-f may be partially inserted into their corresponding female connectors 40a-f at this initial stage of the coupling process. Prior to initial engagement of the fluid connectors 36a-f, 40a-f, the locating pins 43 extending from the implement-side connector block 38 may be received within the corresponding pin openings 45 (FIG. 5) provided in the aft face 48 of the vehicle-side connector block 42.

Figures 8, 9, 10:
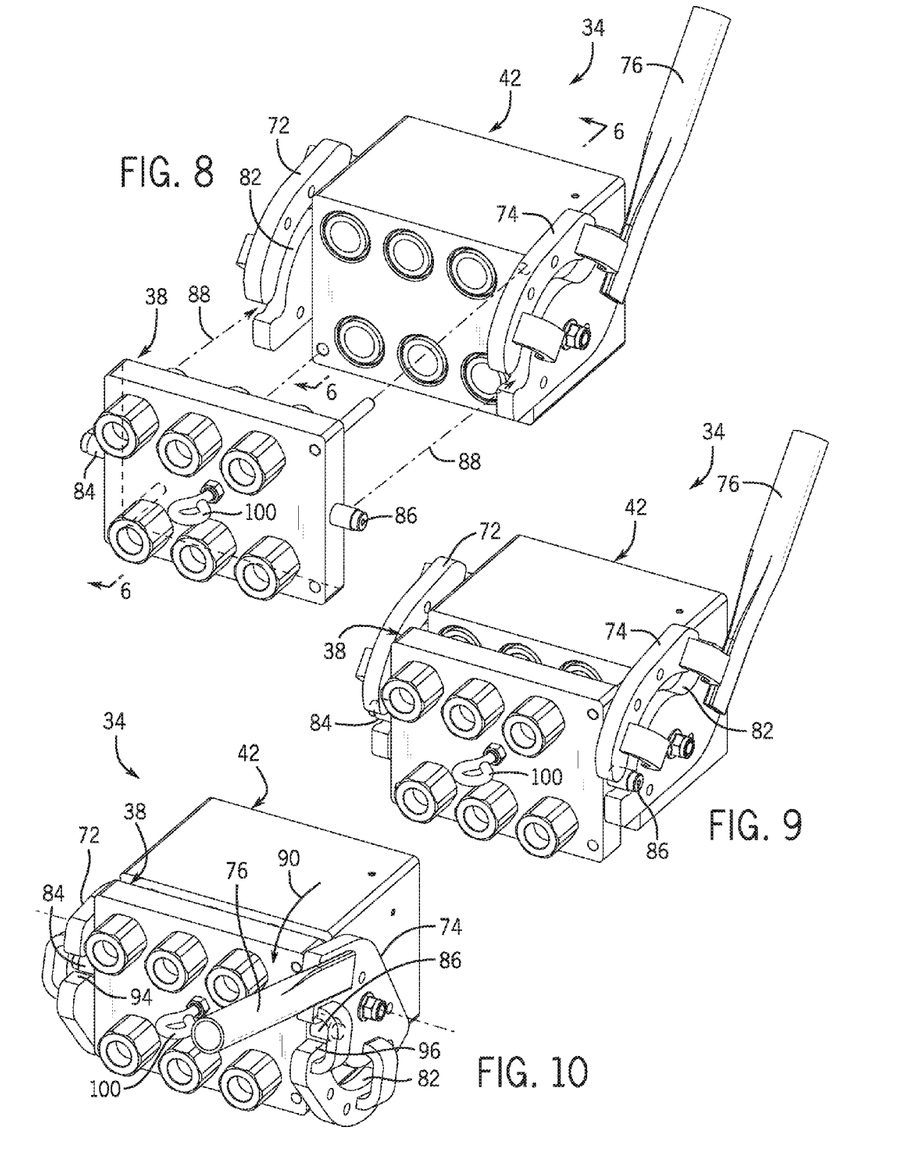
FIGS. 8-10 are isometric views illustrating one manner in which the example multi-coupler assembly shown in FIGS. 2-7 may be manually controlled to bring multiple banks of fluid connectors into mating engagement.
Figure 11:
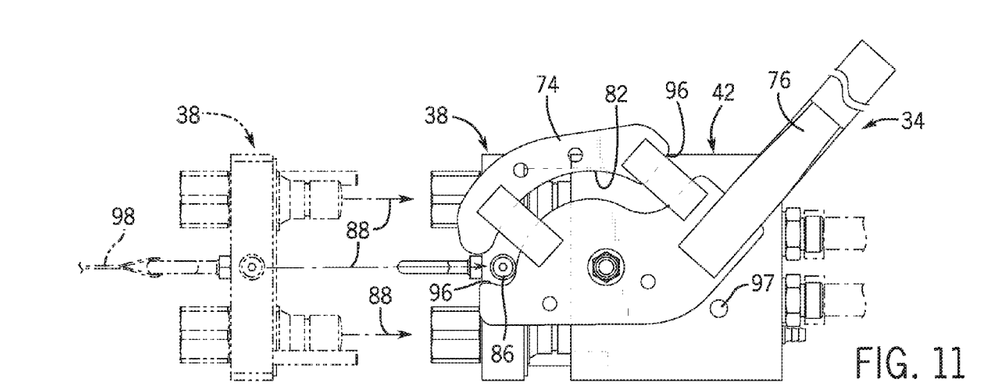
FIGS. 11-13 are side views further illustrating the manner in which the example multi-coupler assembly shown in FIGS. 2-8 may be utilized to bring multiple banks of fluid connectors into mating engagement.
Figure 12:
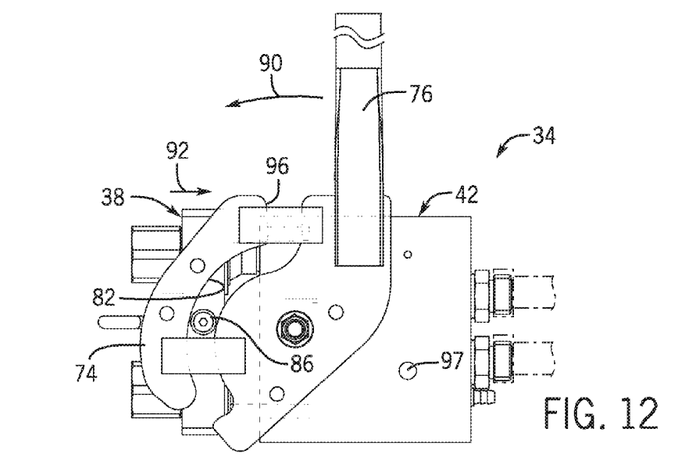
Figure 13:
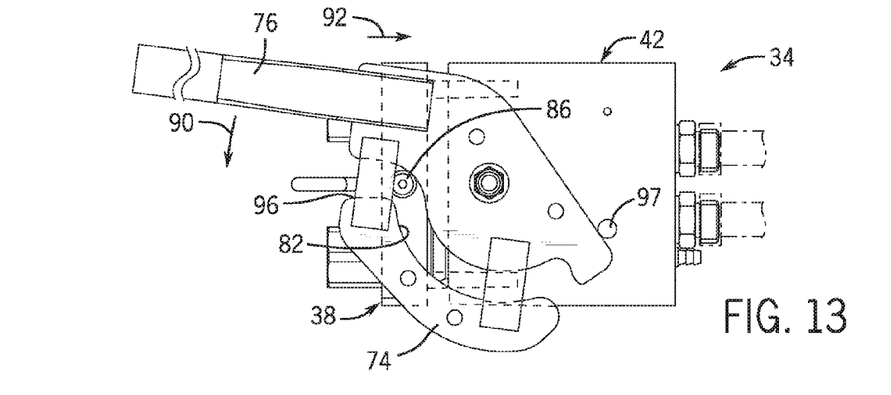

After moving the coupler mechanism 70 to the receiving position and positioning the implement-side connector block 38 in the manner just described, an operator may next grasp the lever 76 and rotate the coupler mechanism 70 to draw the implement-side connector block 38 toward the vehicle-side connector block 42 along the coupling axis 41 (FIG. 5). Specifically, as the operator rotates the lever 76 in the appropriate direction (upwards and toward the vehicle-side connector block 42 in the illustrated example), the roller pins 84, 86 travel within the cam slots 82, 84. As the coupler mechanism 70 is rotated in this manner, the cam-shaped geometry of the slots 82, 84 draw the roller pins 84, 86 and, therefore, the implement-side connector block 38 toward the vehicle-side connector block 42. Stated differently, rotation of the coupler mechanism 70 exerts a convergent force across the connector blocks 38, 42 along the coupling axis 41 (FIG. 5). In the illustrated embodiment, motion of the implement-side connector block 38 is substantially limited to linear or translational movement along the coupling axis 41 (FIG. 5) due to engagement of the locating pins 43 and the pin openings 45 (FIG. 5) and/or due to the engagement of the mating fluid connectors 36a-f, 40a-f. Under the manual control of an operator utilizing the lever 76, the coupler mechanism 70 may continue to rotate until reaching its end of travel (the coupling position). Movement of the coupler mechanism 70 beyond the coupling position may be prevented by the exit slot geometries and/or by contact between the rotatable member 72 and a stop feature 97 projecting laterally from the vehicle-side connector block 42 (shown in FIGS. 4, 5, and 13). As the coupler mechanism 70 is rotated fully into the coupling position shown in FIGS. 10 and 13, the mating pairs of fluid connectors 36a-f, 40a-f are brought into complete engagement in a secure and reliable manner. Movement of the lever 76 and, more generally, of the coupler mechanism 70 is represented in FIGS. 10, 12, and 13 by arrows 90, while movement of the implement-side connect block 38 relative to the vehicle-side connector block 42 is represented by arrows 92.

In the above-described manner, an operator may utilize the coupler mechanism 70 to quickly and simultaneously couple multiple pairs of mating fluid connectors, such as the mating pairs of fluid connectors 36a-f, 40a-f. To subsequently disconnect the fluid connectors 36a-f, 40a-f when, for example, it is desired to detach the work implement from the work vehicle, an operator need only reverse the steps previously described. Specifically, the operator may rotate the lever 76 in the opposing direction to initially disconnect the mating pairs of fluid connectors 36a-f, 40a-f, and then separate the implement-side connector block 38 from the vehicle-side connector block 42 to complete the disconnection process. In this manner, the example multi-coupler assembly 34 permits mating banks of fluid connectors to be quickly and accurately connected or disconnected, as desired. However, the multi-coupler assembly 34 does not lock the implement-side connector block 38 in a fixed spatial relationship with respect to the vehicle-side connector block 42. Instead, the multi-coupler assembly 34 permits the detachment of mating banks of fluid connectors 36 and 40 in the unlikely event of implement breakaway, as described more fully below. Additionally, in many embodiments, the multi-coupler assembly 34 may be configured to remove or greatly reduce the convergent force exerted across the connector blocks 38, 42 when the coupler mechanism 70 is rotated fully into the coupling position. In such embodiments, the mating pairs of the fluid connectors 36a-f, 40a-f may each exert a latching force sufficient to prevent disengagement of the fluid connectors 36a-f, 40a-f under normal operating conditions when pressurized fluid is passed therethrough. Additionally or alternatively, the coupler mechanism 70 or another portion of the multi-coupler assembly 34 may be configured to exert a controlled latching force (e.g., via the provision of one or more magnetic or spring-loaded detent features), which prevents the undesired divergent movement of the connector blocks 38, 42, but which is overcome during a breakaway event to allow a controlled separation of the fluid connectors 36a-f, 40a-f in the below-described manner.

The multi-coupler assembly 34 is further equipped with at least one breakaway feature that facilitates controlled disengagement of the fluid connectors 36a-f from the fluid connectors 40a-f along the coupling axis 41 (FIG. 5) during a breakaway event. The breakaway feature or features allow for such a controlled disengagement when the coupler mechanism 70 is in the coupling position and without requiring movement of the coupler mechanism 70 therefrom. In many embodiments, the breakaway feature may be integrated into the coupler mechanism 70. In the illustrated example, specifically, the breakaway features assume the form of exit slots 94, 96 formed in the rotatable members 72, 74 of the coupler mechanism 70, respectively. The exit slots 94, 96 intersect the respective terminals ends of the cam slots 80, 82; that is, the terminal ends of the cam slots 80, 82 into which the roller pins 84, 86 travel when the coupler mechanism 70 is latched to the implement-side connector block 38 and then rotated into the coupling position shown in FIGS. 10 and 13. The exit slots 94, 96 may have any suitable dimensions and geometries permitting the roller pins 84, 86 to pass therethrough when the coupler mechanism 70 is in the coupling position. In the illustrated example, the exit slots 94, 96 each have a substantially straight geometry and widths substantially equivalent to the widths of the cam slots 80, 82, respectively, and slightly greater than the outer diameters of the roller pins 84, 86.

Figure 14:
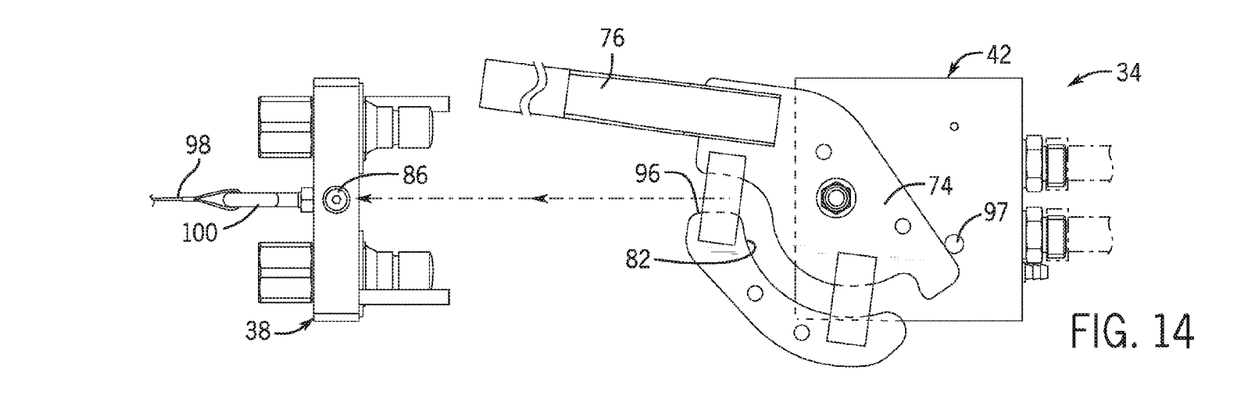
FIG. 14 is a side view illustrating separation of certain features of the multi-coupler assembly during a breakaway event.

As noted above, the exit slots 94, 96 are formed in the rotatable members 72, 74, respectively. Consequently, the orientation of the exit slots 94, 96 will vary in conjunction with the rotation of the coupler mechanism 70. Specifically, as the coupler mechanism 70 is rotated from the receiving to the coupling position, the exit slots 94, 96 may rotate from a first orientation in which the exit slots 94, 96 are angled or non-parallel with respect to the coupling axis 41 (FIG. 5) to a second orientation in which the slots 94, 96 each extend substantially parallel to the coupling axis 41 (FIG. 5). When the coupler mechanism 70 is rotated into the coupling position (FIGS. 10 and 13) and the exit slots 94, 96 are oriented substantially parallel to the coupling axis 41 (FIG. 5), the roller pins 84, 86 may pass through the exit slots 94, 96 to allow the implement-side connector block 38 to diverge from the vehicle-side connector block 42 when a sufficient divergent force is exerted urging the separation of the connector blocks 38, 42, as shown in FIG. 14. The multi-coupler assembly 34 will consequently permit divergent movement of the connector blocks 38, 42 and, therefore, controlled separation of the fluid connectors 36a-f, 40a-f in the event of implement breakaway. The likelihood of damage to the multi-coupler assembly 34, the fluid lines, and the other surrounding components is minimized as a result.

In alternative embodiments, the geometries of the exit slots 94, 96 (or other guideway features) can vary, as can the positioning of the exit slots 94, 96 relative to the roller pins 84, 86 (or other guides) when the coupler mechanism 70 is rotated into the coupling position (FIGS. 10 and 13). For example, in certain embodiments, the exit slots 94, 96 may be shaped such that the roller pins 84, 86 need travel over a small ramp or contoured hump when first entering the exit slots 94, 96. This may help provide an additional latching force or detent feature to further deter inadvertent detachment of the fluid connectors 36a-f, 40a-f when the coupler mechanism 70 is in the coupling position. To prevent interference with the above-described breakaway functionality, the exit slots 94, 96 will still be dimensioned and shaped in a manner enabling the roller pins 84, 86 to enter and travel through the exit slots 94, 96. As a corollary, there may occur relatively minor rotational movement of the coupler mechanism 70 and/or limited off-axis movement of the implement-side coupler block 38 (relative to the coupling axis 41 identified in FIG. 5) as the roller pins 84, 86 travel through the exit slots 94, 96 during breakaway. However, in such an embodiment, the coupler mechanism 70 will still typically remain substantially stationary during the breakaway process (or, at minimum, the mechanism 70 will not return fully to the receiving position), while the relative movement of the coupler blocks 38, 42 and the connector banks 36, 40 will still remain generally confined linear motion along the coupling axis 41 (FIG. 5). Similarly, and as previously noted, the multi-coupler assembly 34 can include various other detent or latching features that serve to deter the separation of the coupler blocks 38, 42 and the decoupling of the fluid connectors 36, 40 along the coupling axis 41 (FIG. 5) when the coupler mechanism 70 resides in the coupling position until a divergent force exerted on the coupler blocks 38, 42 along the axis 41 surpasses a minimum threshold value.

To further decrease the likelihood of damage to the fluid lines during breakaway, the multi-coupler assembly 34 may also be equipped with a mechanism or device for exerting a divergent force on the connector blocks 38, 42 prior to the exertion of significant pulling forces on the fluid lines. For example, as indicated in FIGS. 3-13, the multi-coupler assembly 34 may be equipped with a cable tether 98 having a first end connected to the implement-side connector block 38 utilizing, for example, an I-bolt 100 or other fastener. Opposite the attachment point to the implement-side connector block 38, the second end of the tether 98 may be attached to the work implement. Notably, the tether 98 is imparted with a slack length that is less than a slack length of each of the plurality of fluid lines to which the fluid connectors 36a-f are attached, as measured along respective lengths of the plurality of fluid lines taken from the implement-side connector block 38 to the plurality of implement attachment points. In this manner, the tether 98 will exert a pull force on the implement-side connector block 38 during a breakaway event to urge divergent movement of the connector blocks 38, 42 along the coupling axis 41 (FIG. 5) and, therefore, disengagement of the fluid connectors 36a-f, 40a-f. Stated differently, the tether 98 is dimensioned (e.g., imparted with a particular length) such that a primary pull force is exerted on the implement-side connector block 38 through the tether 98 (rather than through the fluid connectors 36a-f and their associated fluid lines) during a breakaway event.

There has thus been provided embodiments of a work vehicle multi-coupler assembly having a controlled breakaway functionality. In the event of implement breakaway, the multi-coupler mechanism permits the controlled detachment of mating banks of fluid connectors in manner reducing or substantially eliminating the likelihood of damage to the coupler mechanism, to the fluid lines, and to the surrounding work vehicle components. The breakaway feature(s) may be integrated into a coupler mechanism, such as a manually-actuated cam-lever device, included within the multi-coupler assembly. In such embodiments, the multi-coupler assembly may include first and second connector blocks, which secure first and second banks of fluid connectors in corresponding arrays. When moved toward a coupling position, the coupler mechanism may bring the connector blocks into a relative position in which the first bank of fluid connectors matingly engages the second bank of fluid connectors along a coupling axis. The breakaway feature may then facilitate or enable controlled breakaway of the fluid connector banks along the coupling axis during a breakaway event and without requiring movement of the coupler mechanism. In one embodiment, and by way of non-limiting example only, the breakaway feature may be an exit slot formed in the coupler mechanism and permitting passage of a guide (e.g., roller pin) when the coupler mechanism is moved into the coupling position. A tether may further be connected to the implement-side connector block and provided with a slack length less than the respective slack lengths of one or more fluid lines carried by the implement. In this manner, a pull force urging separation of the connector blocks will be primarily or exclusively applied through the tether rather than through the fluid lines should a breakaway event occur.

While at least one example embodiment has been presented in the foregoing description, it should be appreciated that a vast number of variations exist. It should also be appreciated that the example embodiment(s) are only examples, and are not intended to limit the scope, applicability, or configuration of the invention in any way. Rather, the foregoing description will provide those skilled in the art with a convenient road map for work implementing an example embodiment of the invention. It should be understood that various changes may be made in the function and arrangement of elements described in the foregoing examples without departing from the scope of the invention as set-forth in the appended claims.

What is claimed is:

1. A work vehicle multi-coupler assembly, comprising:
a first bank of fluid connectors;
a second bank of fluid connectors configured to matingly engage the first bank of fluid connectors along a coupling axis;
a coupler mechanism coupled to the first bank of fluid connectors and controllable to bring the second bank of fluid connectors into mating engagement with the first bank of fluid connectors;
a breakaway feature integrated into the coupler mechanism and facilitating disengagement of the first bank of fluid connectors from the second bank of fluid connectors along the coupling axis during a breakaway event;
a first connector block into which the first bank of fluid connectors is inserted;
a second connector block into which the second bank of fluid connectors is inserted; and
a tether attached to the second connector block and configured to exert a pull force during a breakaway event to urge disengagement of the second bank of fluid connectors from the first bank of fluid connectors.

2. The work vehicle multi-coupler assembly of claim 1, wherein the coupler mechanism brings the first and second banks of fluid connectors into mating engagement when moved from a receiving position toward a coupling position; and
wherein the breakaway feature facilitates disengagement of the first and second banks of fluid connectors when the coupler mechanism is in the coupling position.

3. The work vehicle multi-coupler assembly of claim 1, wherein the breakaway feature is an exit slot formed in the coupler mechanism and configured to permit a guide associated with the second bank of connectors to pass through the exit slot during the breakaway event.

4. The work vehicle multi-coupler assembly of claim 1, wherein the fluid connectors in the first bank of fluid connectors are each configured to latch to a mating fluid connector in the second bank of fluid connectors when the coupler mechanism is utilized to bring the first and second banks of fluid connectors into mating engagement.

5. The work vehicle multi-coupler assembly of claim 4, wherein the coupler mechanism is movable between first and second rotational positions; and
wherein the coupler mechanism exerts a convergent coupling force across the first and second banks of fluid connectors when moved from the first rotational position toward the second rotational position so as to bring the first and second banks of fluid connectors into mating engagement.

6. The work vehicle multi-coupler assembly of claim 5, wherein the coupler mechanism is configured to remove the convergent coupling force applied across the first and second banks of fluid connectors when moved into the second rotational position.

7. The work vehicle multi-coupler assembly of claim 1, further comprising a first connector block into which the first bank of fluid connectors is inserted and to which the coupler mechanism is rotatably mounted.

8. The work vehicle multi-coupler assembly of claim 1, wherein the tether is attached to a work vehicle implement at an end opposite the second connector block.

9. The work vehicle multi-coupler assembly of claim 1, wherein the pull force is exerted on the second connector block through the tether during the breakaway event.

10. The work vehicle multi-coupler assembly of claim 1, wherein the coupler mechanism draws the second connector block into a neighboring position adjacent the first connector block to bring the first and second banks of fluid connectors into mating engagement.

11. The work vehicle multi-coupler assembly of claim 10, wherein the second connector block comprises at least one opening into which individual fluid connectors are matingly insertable when second connector block is in the neighboring position.

12. The work vehicle multi-coupler assembly of claim 10, wherein the coupler mechanism comprises a rotatable member rotatably mounted to the first connector block and cooperating with the second connector block to form an engagement interface comprising:
 a guideway; and
 a guide traveling along the guideway as the rotatable member is rotated from the receiving position toward the coupling position to bring the first and second banks of fluid connectors into mating engagement.

13. The work vehicle multi-coupler attachment of claim 12, wherein the vehicle-side and implement-side fluid connector banks matingly engage along a coupling axis; and
 wherein the breakaway feature substantially confines the implement-side connector block to movement along the coupling axis during controlled breakaway of the implement-side connector block from the vehicle-side connector block.

14. A work vehicle multi-coupler assembly utilized in conjunction with a work implement including an implement-side fluid connector bank retained in an implement-side connector block, the work vehicle multi-coupler assembly:
 a vehicle-side fluid connector bank;
 a vehicle-side connector block into which the vehicle-side fluid connector bank is inserted; and
 a coupler mechanism movably coupled to the vehicle-side connector block and configured to latch to the implement-side connector block, the coupler mechanism bringing the implement-side fluid connector bank into mating engagement with the vehicle-side fluid connector bank when latched to the implement-side connector block and moved from a receiving position toward a coupling position; and
 a tether attached to the implement-side connector block;
 wherein the coupler mechanism comprises a breakaway feature permitting controlled breakaway of the vehicle-side fluid connector bank and the implement-side fluid connector bank while the coupler mechanism remains substantially in the coupling position; and
 wherein the tether is configured to exert a pull force on the implement-side connector block during breakaway of the vehicle-side fluid connector bank from the implement-side connector bank.

15. The work vehicle multi-coupler assembly of claim 14, wherein a guide member extends from the implement-side connector block, and wherein the coupler mechanism comprises:
 a rotatable member rotatably mounted to the vehicle-side connector block; and
 a guideway formed in the rotatable member and configured to receive the guide member therein, the guide traveling along the guideway as the rotatable member is rotated from the receiving position toward the coupling position to bring the vehicle-side and implement-side fluid connector banks into mating engagement.

16. The work vehicle multi-coupler assembly of claim 15, wherein the breakaway feature comprises an exit slot formed in the rotatable member and intersecting the guideway.

17. The work vehicle multi-coupler assembly of claim 16, wherein the vehicle-side and implement-side fluid connector banks are brought into mating engagement along a coupling axis; and
 wherein the exit slot extends substantially parallel to the coupling axis when the rotatable member is in the coupling position.

18. A work vehicle for removable connection with an implement including an implement-side fluid connector bank retained in an implement-side connector block having a guide, the work vehicle comprising:
 a vehicle body;
 a multi-coupler assembly attached to the vehicle body, the multi-coupler assembly comprising:
 a vehicle-side fluid connector bank retained in a vehicle-side connector block and configured to matingly engage the implement-side fluid connector bank;
 a coupler mechanism rotatably coupled to the vehicle-side connector block and movable between a receiving position and a coupling position, the coupler mechanism having a guideway in which the guide is received, the coupler mechanism rotatable to bring the implement-side fluid connector bank into mating engagement with the vehicle-side fluid connector bank when the guide is received in the guideway;
 a breakaway feature comprising an exit slot formed in the coupler mechanism and intersecting the guideway; and
 a tether connected between the implement and the implement-side connector block, the tether configured to exert a pull force on the implement-side connector block during breakaway of the implement from the vehicle body;
 wherein, when the coupler mechanism is in the coupling position, the breakaway feature permits the guide to pass through the exit slot and thereby facilitate disengagement of the first and second banks of fluid connectors during breakaway of the implement from the vehicle body.

* * * * *